(12) United States Patent
Chen

(10) Patent No.: US 11,281,051 B2
(45) Date of Patent: Mar. 22, 2022

(54) DISPLAY PANEL AND METHOD FOR FABRICATING SAME

(71) Applicant: TCL CHINA STAR OPTOELECTRONICS TECHNOLOGY CO., LTD., Shenzhen (CN)

(72) Inventor: Zhongtian Chen, Shenzhen (CN)

(73) Assignee: TCL CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/251,308

(22) PCT Filed: May 21, 2020

(86) PCT No.: PCT/CN2020/091552
§ 371 (c)(1),
(2) Date: Dec. 11, 2020

(87) PCT Pub. No.: WO2021/189630
PCT Pub. Date: Sep. 30, 2021

(65) Prior Publication Data
US 2022/0050336 A1 Feb. 17, 2022

(30) Foreign Application Priority Data
Mar. 27, 2020 (CN) .......................... 202010227105.6

(51) Int. Cl.
*G02F 1/1337* (2006.01)
*G02F 1/137* (2006.01)
(Continued)

(52) U.S. Cl.
CPC ...... *G02F 1/133723* (2013.01); *G02F 1/1334* (2013.01); *G02F 1/1337* (2013.01);
(Continued)

(58) Field of Classification Search
CPC ............... G02F 1/13471; G02F 1/1347; G02F 1/13712; G02F 1/133723; G02F 1/1337; G02F 1/1343; G02F 1/1334
See application file for complete search history.

(56) References Cited

U.S. PATENT DOCUMENTS

| | | | | |
|---|---|---|---|---|
| 2013/0010244 A1* | 1/2013 | Suwa | ...................... | C09K 19/56 349/123 |
| 2015/0349028 A1* | 12/2015 | Lee | ........................ | G02F 1/1334 349/86 |

(Continued)

FOREIGN PATENT DOCUMENTS

| | | |
|---|---|---|
| CN | 101840098 A | 9/2010 |
| CN | 105700245 A | 6/2016 |

(Continued)

*Primary Examiner* — Jia X Pan
(74) *Attorney, Agent, or Firm* — The Roy Gross Law Firm, LLC; Roy Gross

(57) ABSTRACT

A display panel and a method for fabricating the same are provided. The display panel includes a first substrate, a first protrusion, a first liquid crystal layer, a third liquid crystal layer, a second liquid crystal layer, a second protrusion, and a second substrate in order from top to bottom. The first liquid crystal layer, the second liquid crystal layer, and the third liquid crystal layer include negative type liquid crystal molecules. An absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer.

12 Claims, 5 Drawing Sheets

(51) Int. Cl.
*G02F 1/1343* (2006.01)
*G02F 1/1334* (2006.01)
*G02F 1/1347* (2006.01)

(52) U.S. Cl.
CPC ........ *G02F 1/1343* (2013.01); *G02F 1/13471* (2013.01); *G02F 1/13712* (2021.01)

(56) References Cited

U.S. PATENT DOCUMENTS

| | | | |
|---|---|---|---|
| 2017/0031214 A1* | 2/2017 | Oh | G02F 1/133723 |
| 2017/0205667 A1 | 7/2017 | Suh et al. | |
| 2018/0101070 A1 | 4/2018 | Song et al. | |
| 2019/0171072 A1* | 6/2019 | Kim | G02F 1/133345 |
| 2019/0278115 A1* | 9/2019 | Khan | C09K 19/544 |

FOREIGN PATENT DOCUMENTS

| | | | |
|---|---|---|---|
| CN | 106842714 A | 6/2017 | |
| CN | 106980211 A | 7/2017 | |
| CN | 109143690 A | 1/2019 | |
| CN | 110071371 A | 7/2019 | |

\* cited by examiner

DISPLAY PANEL AND METHOD FOR FABRICATING SAME

CROSS REFERENCE TO RELATED APPLICATIONS

This application is a National Phase of PCT Patent Application No. PCT/CN2020/091552 having International filing date of May 21, 2020, which claims the benefit of priority of Chinese Application No. 202010227105.6 filed on Mar. 27, 2020. The contents of the above applications are all incorporated by reference as if fully set forth herein in their entirety.

FIELD OF INVENTION

The present disclosure relates to the technical field of display, and particularly to a display panel and a method for fabricating the same.

BACKGROUND

An amount of light of a backlight passing through a liquid crystal layer is regulated by a deflection of liquid crystal molecules, thereby allowing a liquid crystal display (LCD) panel to display an image. In a case of vertical alignment, reactive monomers (RMs) in the liquid crystal layer will form polymer protrusions on a surface of an alignment film to anchor the liquid crystal molecules to form a pre-tilt angle.

However, when the liquid crystal molecules deflect under action of an electric field, the polymer protrusions on the surface of the alignment film will interfere with the deflection of the liquid crystal molecules nearby, causing the liquid crystal molecules to deflect accordingly. As a result, the nearby liquid crystal molecules cannot deflect in a predetermined direction, which affects a light transmittance of the backlight, and ultimately reduces display quality of the image.

Therefore, it is necessary to provide a display panel that can reduce interference of the polymer protrusions on the surface of the alignment film on the deflection of the liquid crystal molecules under the action of the electric field, and a method for fabricating the same.

SUMMARY OF DISCLOSURE

The present disclosure provides a display panel and a method for fabricating the same to solve the problem that the interference of the polymer protrusions on the surface of the alignment film on the deflection of the liquid crystal molecules under the action of the electric field ultimately reduces display quality of the image.

The present disclosure provides a display panel comprising:
  a first substrate provided with a first protrusion on a side thereof;
  a second substrate disposed opposite to the first substrate, and provided with a second protrusion on its side close to the first protrusion; and
  a liquid crystal layer comprising:
    a first liquid crystal layer disposed on a side of the first protrusion close to the second protrusion;
    a second liquid crystal layer disposed on a side of the second protrusion close to the first protrusion; and
    a third liquid crystal layer disposed between the first liquid crystal layer and the second liquid crystal layer;

wherein liquid crystal molecules in the first liquid crystal layer, liquid crystal molecules in the second liquid crystal layer, and liquid crystal molecules in the third liquid crystal layer are all negative type liquid crystal molecules, and an absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a difference between a deflection value of the liquid crystal molecules in the first liquid crystal layer and a deflection value of the liquid crystal molecules in the third liquid crystal layer is within a preset range, and a difference between a deflection value of the liquid crystal molecules in the second liquid crystal layer and the deflection value of the liquid crystal molecules in the third liquid crystal layer is also within the preset range;

wherein at least one of the absolute value of the dielectric anisotropy parameter of the liquid crystal molecules in the first liquid crystal layer and the absolute value of the dielectric anisotropy parameter of the liquid crystal molecules in the second liquid crystal layer is not less than 4; and wherein the first substrate comprises a first alignment layer, the second substrate comprises a second alignment layer, and at least one of the first alignment layer and the second alignment layer comprises

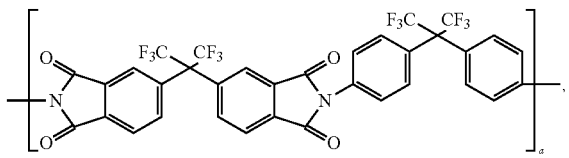

where a is not less than 50 and not greater than 300.

In an embodiment, wherein the absolute value of the dielectric anisotropy parameter of the liquid crystal molecules in the third liquid crystal layer is not less than 3 and less than 4.

In an embodiment, the first substrate further comprises a first electrode layer disposed on a side of the first alignment layer away from the liquid crystal layer, the second substrate further comprises a second electrode layer disposed on a side of the second alignment layer away from the liquid crystal layer, there is an electric field between the first electrode layer and the second electrode layer, and the electric field deflects liquid crystal molecules in the liquid crystal layer.

The present disclosure further provides a display panel comprising:
  a first substrate provided with a first protrusion on a side thereof;
  a second substrate disposed opposite to the first substrate, and provided with a second protrusion on its side close to the first substrate; and
  a liquid crystal layer comprising:
    a first liquid crystal layer disposed on a side of the first protrusion close to the second protrusion;
    a second liquid crystal layer disposed on a side of the second protrusion close to the first protrusion; and a third liquid crystal layer disposed between the first liquid crystal layer and the second liquid crystal layer;

wherein liquid crystal molecules in the first liquid crystal layer, liquid crystal molecules in the second liquid crystal layer, and liquid crystal molecules in the third liquid crystal layer are all negative type liquid crystal molecules, and an absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a difference between a deflection value of the liquid crystal molecules in the first liquid crystal layer and a deflection value of the liquid crystal molecules in the third liquid crystal layer and a difference between a deflection value of the liquid crystal molecules in the second liquid crystal layer and the deflection value of the liquid crystal molecules in the third liquid crystal layer are within a preset range.

In an embodiment, at least one of the absolute value of the dielectric anisotropy parameter of the liquid crystal molecules in the first liquid crystal layer or the absolute value of the dielectric anisotropy parameter of the liquid crystal molecules in the second liquid crystal layer is not less than 4.

In an embodiment, the absolute value of the dielectric anisotropy parameter of the liquid crystal molecules in the third liquid crystal layer is not less than 3 and less than 4.

In an embodiment, the first substrate comprises a first alignment layer, the second substrate comprises a second alignment layer, and at least one of the first alignment layer and the second alignment layer comprises

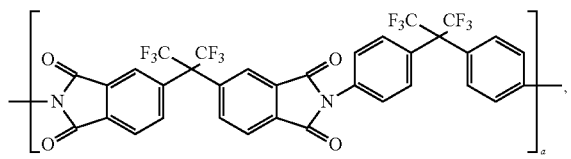

where a is not less than 50 and not greater than 300.

In an embodiment, the first substrate further comprises a first electrode layer disposed on a side of the first alignment layer away from the liquid crystal layer, the second substrate further comprises a second electrode layer disposed on a side of the second alignment layer away from the liquid crystal layer, there is an electric field between the first electrode layer and the second electrode layer, and the electric field deflects liquid crystal molecules in the liquid crystal layer.

The present disclosure further provides a method for fabricating a display panel comprising:

providing a first substrate, a second substrate, a third substrate, and a fourth substrate, wherein the first substrate and the third substrate are oppositely disposed, the second substrate and the fourth substrate are oppositely disposed, the first substrate is provided with a first protrusion on its side close to the third substrate, the second substrate is provided with a second protrusion on its side close to the fourth substrate;

forming a first sacrificial layer on a side of the third substrate close to the first substrate;

forming a second sacrificial layer on a side of the fourth substrate close to the second substrate;

disposing a target mixture between the first substrate and the first sacrificial layer;

disposing the target mixture between the second substrate and the second sacrificial layer;

cooling the target mixture between the first substrate and the first sacrificial layer to room temperature to form a first liquid crystal layer, wherein liquid crystal molecules in the first liquid crystal layer are negative type liquid crystal molecules;

cooling the target mixture between the second substrate and the second sacrificial layer to room temperature to form a second liquid crystal layer, wherein liquid crystal molecules in the second liquid crystal layer are negative type liquid crystal molecules;

separating the first sacrificial layer and the third substrate from the first liquid crystal layer;

separating the second sacrificial layer and the fourth substrate from the second liquid crystal layer;

disposing the first substrate and the second substrate oppositely; and disposing a third liquid crystal layer between the first liquid crystal layer and the second liquid crystal layer, wherein liquid crystal molecules in the third liquid crystal layer are negative type liquid crystal molecules;

wherein an absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a difference between a deflection value of the liquid crystal molecules in the first liquid crystal layer and a deflection value of the liquid crystal molecules in the third liquid crystal layer is within a preset range, and a difference between a deflection value of the liquid crystal molecules in the second liquid crystal layer and the deflection value of the liquid crystal molecules in the third liquid crystal layer is also within the preset range.

In an embodiment, the target mixture is composed of a liquid crystal material and a polyimide material, a mass ratio of the liquid crystal material and the polyimide material is 7:3 or 8:2, an absolute value of a dielectric anisotropy parameter of liquid crystal molecules in the liquid crystal material is not less than 4, and the polyimide material comprises

where a is not less than 50 and not greater than 300.

In an embodiment, at least one of the absolute value of the dielectric anisotropy parameter of the liquid crystal molecules in the first liquid crystal layer and the absolute value of the dielectric anisotropy parameter of the liquid crystal molecules in the second liquid crystal layer is not less than 4.

In an embodiment, the absolute value of the dielectric anisotropy parameter of the liquid crystal molecules in the third liquid crystal layer is not less than 3 and less than 4.

The present disclosure provides a display panel and a method for fabricating the same. The display panel comprises a first substrate, a second substrate, and a liquid crystal layer. The first substrate and the second substrate are oppositely disposed. The first substrate has a first protrusion on its side close to the second substrate. The second substrate has a second protrusion on its side close to the first protrusion. The liquid crystal layer comprises a first liquid crystal layer close to the first protrusion, a second liquid crystal layer close to the second protrusion, and a third liquid crystal layer between the first liquid crystal layer and the second liquid crystal layer. Liquid crystal molecules in the first liquid crystal layer, the second liquid crystal layer, and the third liquid crystal layer are all negative type liquid crystal molecules. An absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a deflection value of the liquid crystal molecules in the first liquid crystal layer, a deflection value of the liquid crystal molecules in the second liquid crystal layer, and a deflection value of the liquid crystal molecules in the third liquid crystal layer tend to be consistent. This reduces influence of the first protrusion and the second protrusion on a light transmittance of a backlight, and thus improves display quality of an image.

BRIEF DESCRIPTION OF DRAWINGS

The present invention will be further illustrated below with reference to accompanying drawings. It should be noted that the accompanying drawings in the present disclosure are only used to illustrate some embodiments of the present invention. For those skilled in the art, other drawings may be obtained from these accompanying drawings without creative labor.

DETAILED DESCRIPTION

Figure 1:
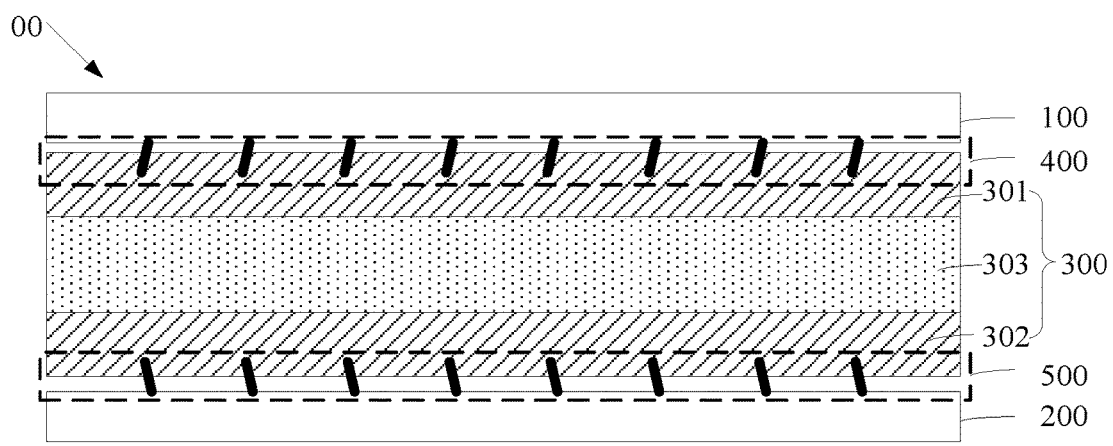
FIG. 1 is a schematic cross-sectional view of a display panel according to an embodiment of the present disclosure.

Technical solutions in embodiments of the present disclosure will be clearly and completely described below in conjunction with accompanying drawings in the embodiments of the present disclosure. It is apparent that the described embodiments are merely a part of the embodiments of the present disclosure and not all embodiments. All other embodiments obtained by those skilled in the art based on the embodiments of the present disclosure without creative labor are within claimed scope of the present disclosure.

In the description of the present disclosure, it should be understood that location or position relationships indicated by terms, such as "close", "away", "right side", "side", "vertical", and "horizontal" are location or position relationships based on an illustration of the accompanying drawings, are merely used for describing the present disclosure and simplifying the description instead of indicating or implying the indicated apparatuses or elements should have specified locations or be constructed and operated according to specified locations, and therefore, should not be intercepted as limitations to the present disclosure. Furthermore, terms such as "first" and "second" are used merely for the purpose of description, but shall not be construed as indicating or implying relative importance or implicitly indicating a number of the indicated technical feature. Hence, the feature defined with "first" and "second" may explicitly or implicitly includes one or more of this feature. In the description of the present disclosure, a term "a plurality of" means "two or more" unless otherwise specifically limited.

In the present disclosure, unless otherwise specifically specified or limited, a structure in which a first feature is "on" or "under" a second feature may comprise an embodiment in which the first feature directly contacts the second feature, and may also comprise an embodiment in which the first feature and the second feature are not in direct contact with each other, but are contacted via an additional feature formed therebetween. Furthermore, a structure in which a first feature is "on", "above", or "on top of" a second feature may comprise an embodiment in which the first feature is right or obliquely "on", "above", or "on top of" the second feature, or just means that a sea-level elevation of the first feature is greater than a sea-level elevation of the second feature. A structure in which a first feature "under", "below", or "on bottom of a second feature may include an embodiment in which the first feature is right "beneath," "below," or "on bottom of" the second feature, and may also comprises an embodiment in which the first feature is right or obliquely "under", "below", or "on bottom of" the second feature, or just means that a sea-level elevation of the first feature is less than a sea-level elevation of the second feature.

The following description provides different embodiments or examples illustrating various structures of the present invention. In order to simplify the description of the present disclosure, only components and settings of specific examples are described below. They are only examples and are not intended to limit the present invention. Furthermore, reference numerals and/or letters may be repeated in different examples of the present disclosure. Such repetitions are for simplicity and clarity, which per se do not indicate relations among the discussed embodiments and/or settings. Furthermore, the present disclosure provides various examples of specific processes and materials, but those skilled in the art can be aware of application of other processes and/or use of other materials.

The present disclosure provides a display panel, which includes but is not limited to the following embodiments.

In an embodiment, as shown in FIG. 1, the display panel 00 comprises a first substrate 100, a second substrate 200, and a liquid crystal layer 300. The first substrate 100 and the second substrate 200 are oppositely disposed. The first substrate 100 has first protrusions 400 on its side close to the second substrate 200. The second substrate 200 has second protrusions 500 on its side close to the first protrusions 400.

In particular, the liquid crystal layer 300 comprises a first liquid crystal layer 301, a second liquid crystal layer 302, and a third liquid crystal layer 303. The first liquid crystal layer 301 is disposed on a side of the first protrusions 400 close to the second protrusions 500. The second liquid crystal layer 302 is disposed on a side of the second protrusions 500 close to the first protrusions 400. The third liquid crystal layer 303 is disposed between the first liquid crystal layer 301 and the second liquid crystal layer 302.

Figure 2:
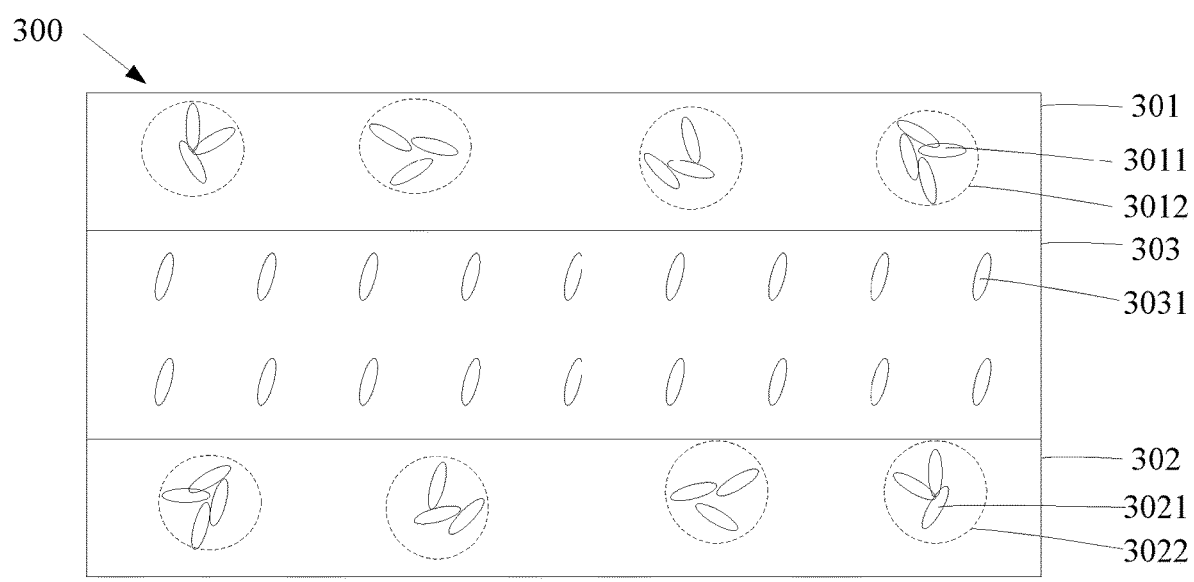
FIG. 2 is a schematic cross-sectional view of a liquid crystal layer according to an embodiment of the present disclosure.

As shown in FIG. 2, liquid crystal molecules 3011 in the first liquid crystal layer 301, liquid crystal molecules 3021 in the second liquid crystal layer 302, and liquid crystal molecules 3031 in the third liquid crystal layer 303 are all negative type liquid crystal molecules. An absolute value of a dielectric anisotropy parameter of the liquid crystal molecules 3011 in the first liquid crystal layer 301 and an absolute value of a dielectric anisotropy parameter of the liquid crystal molecules 3021 in the second liquid crystal layer 302 are both greater than an absolute value of a dielectric anisotropy parameter of the liquid crystal molecules 3031 in the third liquid crystal layer 303. A dielectric anisotropy parameter of a liquid crystal molecule represents a difference between a dielectric constant of the liquid crystal molecule in its long axis direction and a dielectric constant of the liquid crystal molecule in its short axis direction. It is known that an alignment of liquid crystal molecules in an electric field depends on a dielectric anisotropy parameter of the liquid crystal molecules. When the dielectric anisotropy parameter is positive, that is, when the liquid crystal molecules are positive type liquid crystal molecules, the liquid crystal molecules are aligned in a direction of the electric field under the electric field. When the dielectric anisotropy parameter is negative, that is, when the liquid crystal molecules are negative type liquid crystal molecules, the liquid crystal molecules are aligned in a direction perpendicular to the direction of the electric field under the electric field. Furthermore, regardless of whether the liquid crystal molecules are positive type liquid crystal molecules or negative type liquid crystal molecules, under a same electric field, an absolute value of the dielectric anisotropy parameter of the liquid crystal molecules is greater, a force received by the liquid crystal molecules from the electric field will be greater, and a tilting degree of the liquid crystal molecules will also be greater.

It should be noted that an absolute value of a dielectric anisotropy parameter of the liquid crystal molecules 3011 in the first liquid crystal layer 301 and an absolute value of a dielectric anisotropy parameter of the liquid crystal molecules 3021 in the second liquid crystal layer 302 are both greater than an absolute value of a dielectric anisotropy parameter of the liquid crystal molecules 3031 in the third liquid crystal layer 303, so that under action of a same electric field, the first protrusions 400, and the second protrusions 500, a difference between a deflection value of the liquid crystal molecules 3011 in the first liquid crystal layer 301 and a deflection value of the liquid crystal molecules 3031 in the third liquid crystal layer 303 and a difference between a deflection value of the liquid crystal molecules 3021 in the second liquid crystal layer 302 and the deflection value of the liquid crystal molecules 3031 in the third liquid crystal layer 301 are within a preset range. A deflection value comprises a deflection direction of liquid crystal molecules and a deflection angle of the liquid crystal molecules along the direction. The statement "a difference . . . are within a preset range" means that the deflection value of the liquid crystal molecules 3011 in the first liquid crystal layer 301, the deflection value of the liquid crystal molecules 3021 in the second liquid crystal layer 302, and the deflection value of the liquid crystal molecules 3031 in the third liquid crystal 303 layer tend to be consistent. That is, deflection directions of the liquid crystal molecules 3011 in the first liquid crystal layer 301, the liquid crystal molecules 3021 in the second liquid crystal layer 302, and the liquid crystal molecules 3031 in the third liquid crystal layer 303 tend to be consistent. And, deflection angles of the liquid crystal molecules 3011 in the first liquid crystal layer 301, the liquid crystal molecules 3021 in the second liquid crystal layer 302, and the liquid crystal molecules 3031 in the third liquid crystal layer 303 along the direction tend to be consistent.

In an embodiment, the liquid crystal molecules 3011 in the first liquid crystal layer 301, the liquid crystal molecules 3021 in the second liquid crystal layer 302, and the liquid crystal molecules 3031 in the third liquid crystal layer 303 may all be nematic liquid crystal molecules. When the nematic liquid crystal molecules are aligned, long axes of the nematic liquid crystal molecules are parallel to each other and have a same direction.

In an embodiment, at least one of the absolute value of the dielectric anisotropy parameter of the liquid crystal molecules 3011 in the first liquid crystal layer 301 and the absolute value of the dielectric anisotropy parameter of the liquid crystal molecules 3021 in the second liquid crystal layer 302 is not less than 4.

In an embodiment, as shown in FIG. 2, the liquid crystal molecules 3011 in the first liquid crystal layer 301 are contained in first vesicles 3012, and the liquid crystal molecules 3021 in the second liquid crystal layer 302 are contained in second vesicles 3022. Furthermore, at least one of the first vesicles 3012 and the second vesicles 3022 comprises

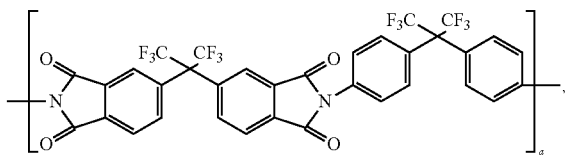

where a is not less than 50 and not greater than 300.

In an embodiment, the absolute value of the dielectric anisotropy parameter of the liquid crystal molecules 3031 in the third liquid crystal layer 303 is not less than 3 and less than 4.

Figure 3:
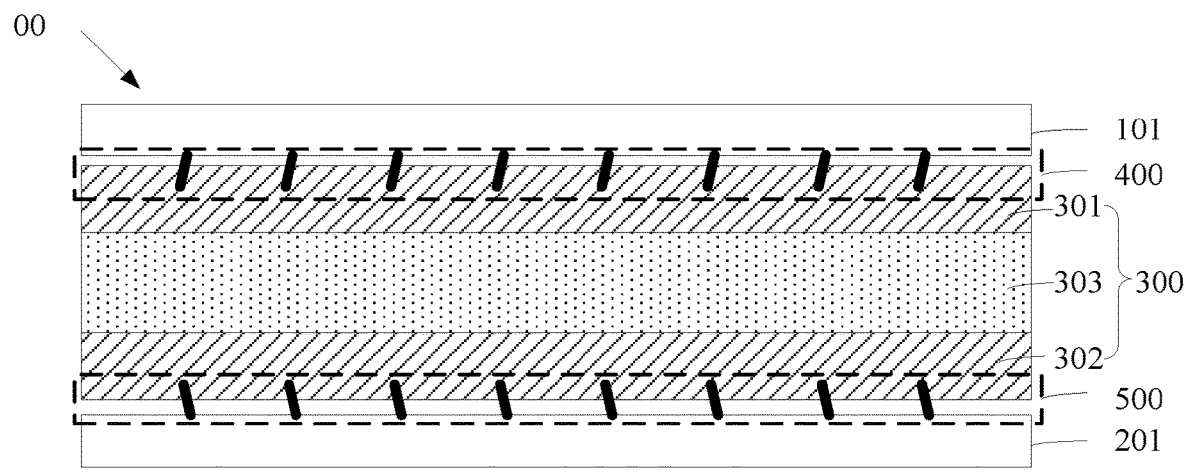
FIG. 3 is a schematic cross-sectional view of another display panel according to an embodiment of the present disclosure.

In an embodiment, as shown in FIG. 3, the first substrate 100 comprises a first alignment layer 101, and the second substrate 200 comprises a second alignment layer 201. At least one of the first alignment layer 101 and the second alignment layer 201 comprises

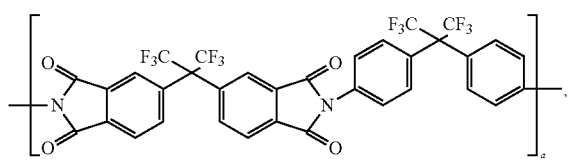

where a is not less than 50 and not greater than 300.

Figure 4:
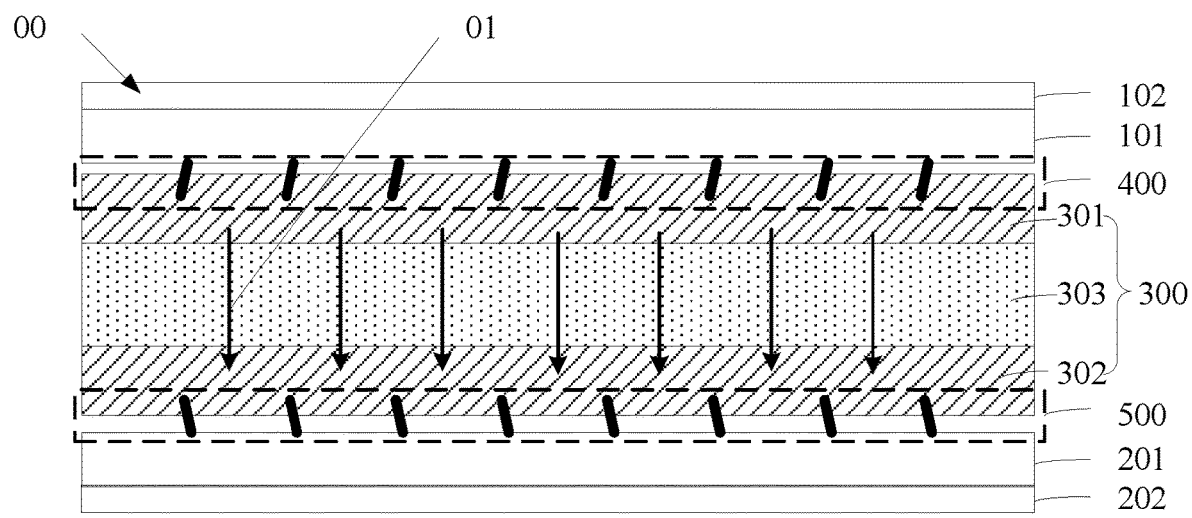
FIG. 4 is a schematic cross-sectional view of yet another display panel according to an embodiment of the present disclosure.

In an embodiment, as shown in FIG. 4, the first substrate 100 further comprises a first electrode layer 102, and the second substrate 200 further comprises a second electrode layer 202. The first electrode layer 102 is disposed on a side of the first alignment layer 101 away from the liquid crystal layer 300. The second electrode layer 202 is disposed on a side of the second alignment layer 201 away from the liquid crystal layer 300. There is an electric field 01 between the first electrode layer 102 and the second electrode layer 202. The electric field 01 deflects liquid crystal molecules 3011, 3021, and 3031 in the liquid crystal layer 300.

Figure 5:
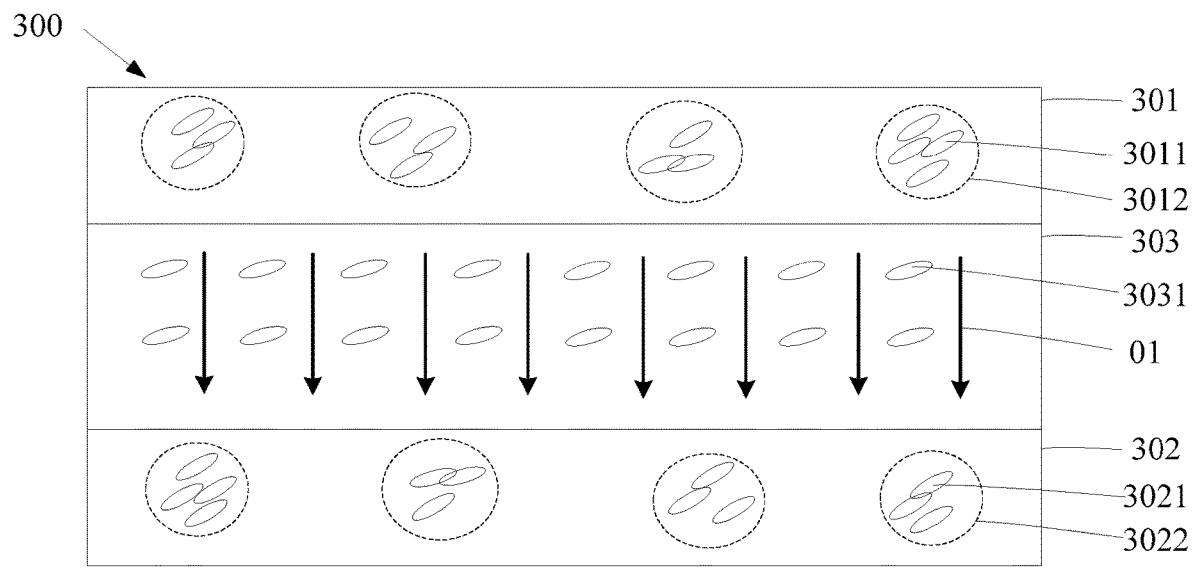
FIG. 5 is a schematic diagram of a deflection of liquid crystal molecules in a liquid crystal layer according to an embodiment of the present disclosure.

For example, when the liquid crystal molecules 3011 in the first liquid crystal layer 301, the liquid crystal molecules 3021 in the second liquid crystal layer 302, and the liquid crystal molecules 3031 in the third liquid crystal layer 303 are all negative type liquid crystal molecules, as shown in FIG. 5, a force of the electric field 01 causes the long axes of the liquid crystal molecules 3011, the liquid crystal molecules 3021, and the liquid crystal molecules 3031 to tend to be aligned in a horizontal direction. The liquid crystal molecules 3011 in the first liquid crystal layer 301 are affected by the first protrusions 400, so that the long axes of the liquid crystal molecules 3011 tend to be arranged in a vertical direction. And, a first electric field force of the electric field 01 causes the long axes of the liquid crystal molecules 3011 to tend to be arranged in a horizontal direction. Similarly, the liquid crystal molecules 3021 in the second liquid crystal layer 302 are affected by the second protrusions 500, so that the long axes of the liquid crystal molecules 3021 tend to be arranged in a vertical direction. And, a second electric field force of the electric field 01 causes the long axes of the liquid crystal molecules 3021 to tend to be arranged in a horizontal direction. However, the liquid crystal molecules 3031 in the third liquid crystal layer 303 are only affected by a third electric field force of the electric field 01, so that the long axes of the liquid crystal molecules 3031 tend to be arranged in a horizontal direction. Understandably, because the absolute value of the dielectric anisotropy parameter of the liquid crystal molecules 3011 in the first liquid crystal layer 301 and the absolute value of the dielectric anisotropy parameter of the liquid crystal molecules 3021 in the second liquid crystal layer 302 are both greater than the absolute value of the dielectric anisotropy parameter of the liquid crystal molecules 3031 in the third liquid crystal layer 303, that is, the first electric field force received by the liquid crystal molecules 3011 and the second electric field force received by the liquid crystal molecules 3021 are both greater than the third electric field force received by the liquid crystal molecules 3031, total forces received by the liquid crystal molecules 3011 and 3021 can make the long axes of the liquid crystal molecules 3011 and 3021 tend to be arranged in a horizontal direction. Furthermore, a deflection value of the liquid crystal molecules 3011, a deflection value of the liquid crystal molecules 3021, and a deflection value of the liquid crystal molecules 3031 may tend to be consistent. Therefore, when the display panel 00 operates, influence of the first protrusions 400 on the liquid crystal molecules 3011 can be relatively reduced, and influence of the second protrusions 500 on the liquid crystal molecules 3021 can be relatively reduced. This can reduce influence on a light transmittance of a backlight in the display panel 00.

Figure 6:
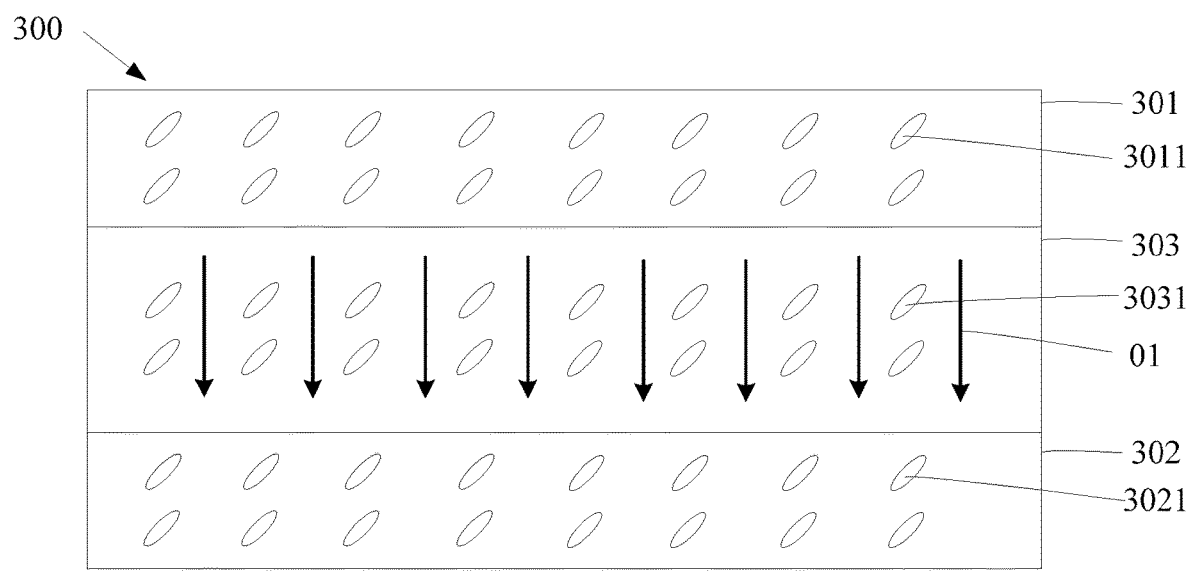
FIG. 6 is a schematic diagram of a deflection of liquid crystal molecules in another liquid crystal layer according to an embodiment of the present disclosure.

For another example, when the liquid crystal molecules 3011 in the first liquid crystal layer 301, the liquid crystal molecules 3021 in the second liquid crystal layer 302, and the liquid crystal molecules 3031 in the third liquid crystal layer 303 are all positive type liquid crystal molecules, as shown in FIG. 6, the force of the electric field 01 aligns the long axes of the liquid crystal molecules 3011, the liquid crystal molecules 3021, and the liquid crystal molecules 3031 in a direction, so that an angle between the long axes and a right side of the first substrate 100 is an acute angle. Understandably, under the action of the electric field 01, the positive type liquid crystal molecules are deflected in a direction at an acute angle to the right side of the first substrate 100. The first protrusions 400 make the long axes of the liquid crystal molecules 3011 tend to be arranged in a vertical direction. The second protrusions 500 make the long axes of the liquid crystal molecules 3021 tend to be arranged in a vertical direction. As a result, the liquid crystal molecules 3011 and the liquid crystal molecules 3021 tend to have their long axes arranged in a vertical direction with respect to the liquid crystal molecules 3031. Therefore, the liquid crystal molecules 3011 and the liquid crystal molecules 3021 should be subjected to a less electric field force, so that their deflections are consistent with the deflection of the liquid crystal molecules 3031. Accordingly, contrary to the above embodiment, the absolute value of the dielectric anisotropy parameter of the liquid crystal molecules 3011 in the first liquid crystal layer 301 and the absolute value of the dielectric anisotropy parameter of the liquid crystal molecules 3021 in the second liquid crystal layer 302 are both less than the absolute value of the dielectric anisotropy parameter of the liquid crystal molecules 3031 in the third liquid crystal layer 303, so that under action of a same electric field, the first protrusions 400, and the second protrusions 500, a difference between a deflection value of the liquid crystal molecules 3011 in the first liquid crystal layer 301 and a deflection value of the liquid crystal molecules 3031 in the third liquid crystal layer 303 and a difference between a deflection value of the liquid crystal molecules 3021 in the second liquid crystal layer 302 and the deflection value of the liquid crystal molecules 3031 in the third liquid crystal layer 301 are within a preset range. When the display panel 00 operates, influence of the first protrusions 400 on the liquid crystal molecules 3011 can be relatively reduced, and influence of the second protrusions 500 on the liquid crystal molecules 3021 can be relatively reduced. This can reduce influence on a light transmittance of a backlight in the display panel 00.

The present disclosure provides a method for fabricating any one of the display panels as described above, which includes but is not limited to the following embodiments.

Figure 7:
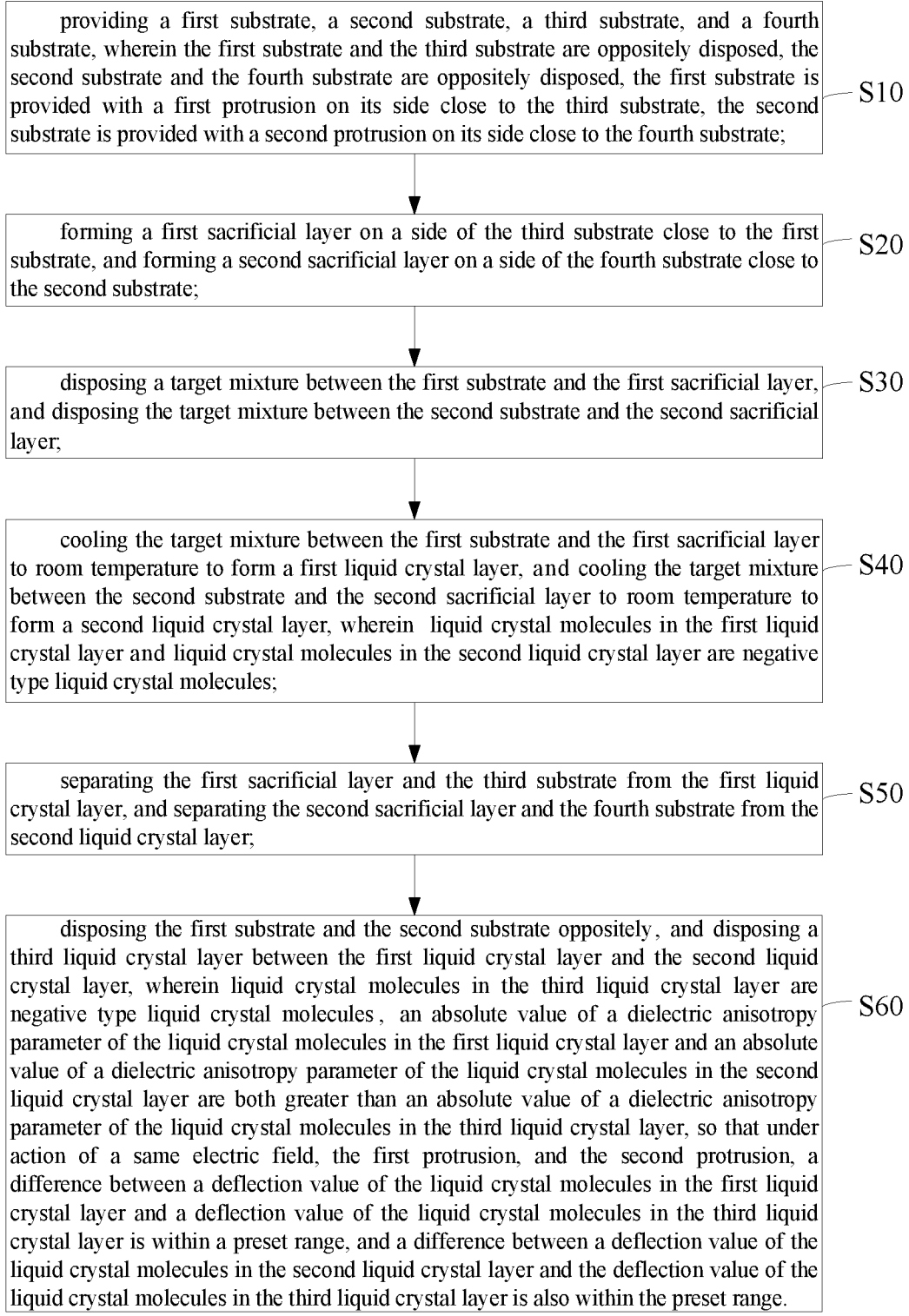
FIG. 7 is a schematic flowchart of a method for fabricating a liquid crystal layer according to an embodiment of the present disclosure.
Figure 8:
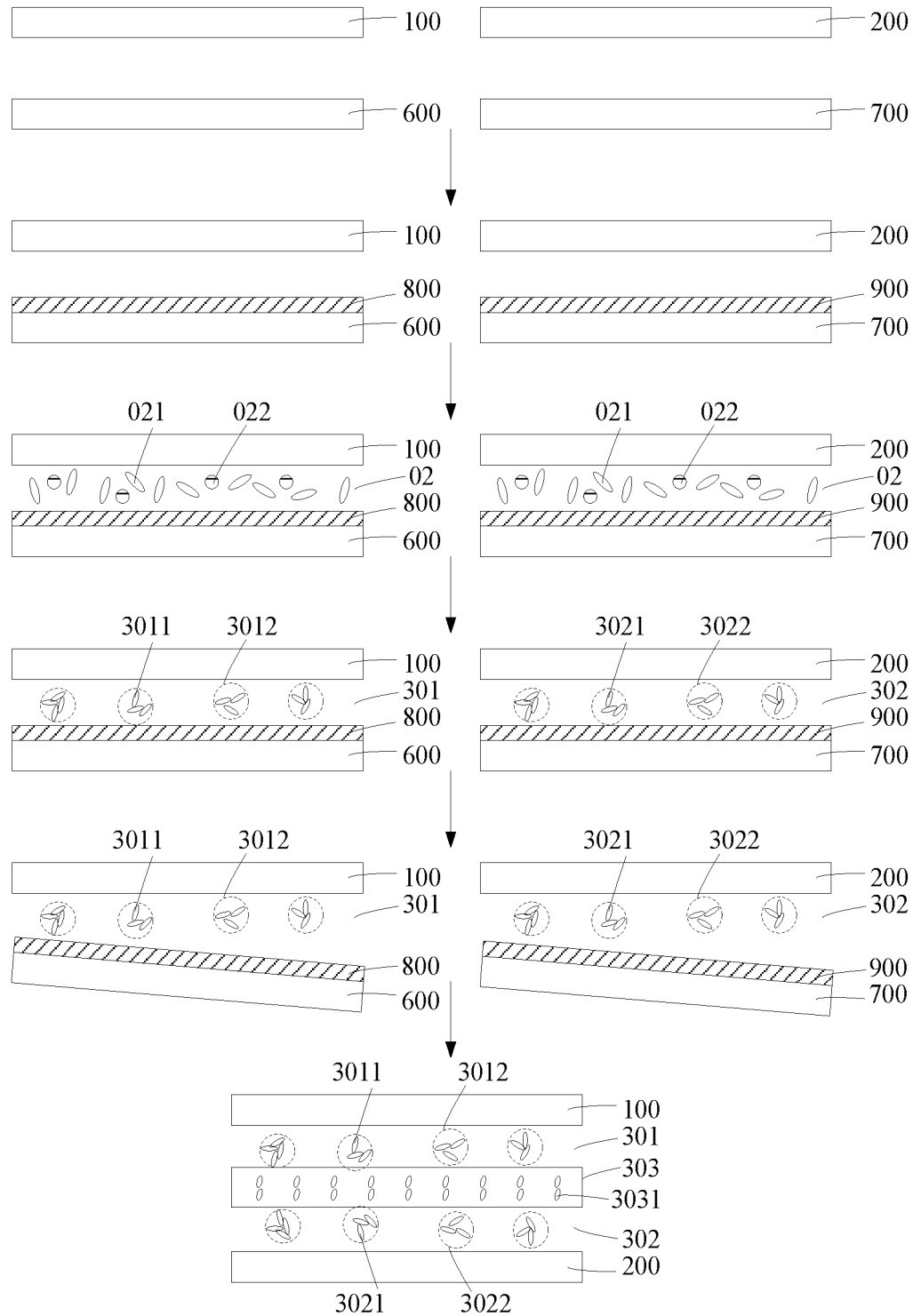
FIG. 8 is a schematic diagram of the method for fabricating the liquid crystal layer according to an embodiment of the present disclosure.

In an embodiment, as shown in FIG. 7 and FIG. 8, the method for fabricating the display panel comprises the following steps.

S10: providing a first substrate 100, a second substrate 200, a third substrate 600, and a fourth substrate 700. The first substrate 100 and the third substrate 600 are oppositely disposed. The second substrate 200 and the fourth substrate 700 are oppositely disposed. The first substrate 100 is provided with first protrusions on its side close to the third substrate 600. The second substrate 200 is provided with second protrusions on its side close to the fourth substrate 700.

In an embodiment, the first substrate 100 comprises a first alignment layer, and the second substrate 200 comprises a second alignment layer. At least one of the first alignment layer and the second alignment layer comprises

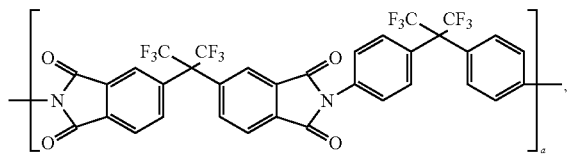

where a is not less than 50 and not greater than 300.

In an embodiment, the first substrate 100 further comprises a first electrode layer. The second substrate 200 further comprises a second electrode layer. The first electrode layer is disposed on a side of the first alignment layer away from the second alignment layer. The second electrode layer is disposed on a side of the second alignment layer away from the first electrode layer.

S20: forming a first sacrificial layer 800 on a side of the third substrate 600 close to the first substrate 100, and forming a second sacrificial layer 900 on a side of the fourth substrate 700 close to the second substrate 200.

In an embodiment, the first sacrificial layer 800 and the second sacrificial layer 900 have thicknesses no greater than 1 mm. The first sacrificial layer 800 and the second sacrificial layer 900 may be ultraviolet light degradation layers. That is, the first sacrificial layer 800 and the second sacrificial layer 900 can be decomposed under irradiation of ultraviolet light, so as to peel off from the first substrate 100 and the second substrate 200, respectively. Specifically, materials of the first sacrificial layer 800 and the second sacrificial layer 900 may comprise at least one of polyvinyl chloride, polysulfone, or polyamide.

S30: disposing a target mixture 02 between the first substrate 100 and the first sacrificial layer 800, and disposing the target mixture 02 between the second substrate 200 and the second sacrificial layer 900.

The target mixture 02 comprises a liquid crystal material 021 and a polyimide material 022. A mass ratio of the liquid crystal material 021 and the polyimide material 022 is 7:3 or 8:2. An absolute value of a dielectric anisotropy parameter of liquid crystal molecules in the liquid crystal material 021 is not less than 4. The polyimide material 022 comprises

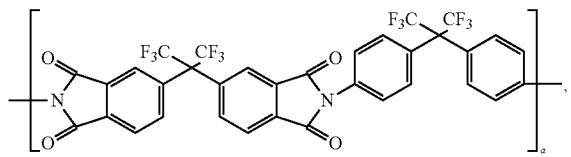

where a is not less than 50 and not greater than 300.

It should be noted that the target mixture 02 needs to be heated to a temperature of 100° C. to 150° C. and is in a molten state before being disposed between the first substrate 100 and the first sacrificial layer 800, and between the second substrate 200 and the second sacrificial layer 900.

S40: cooling the target mixture 02 between the first substrate 100 and the first sacrificial layer 800 to room temperature to form a first liquid crystal layer 301, and cooling the target mixture 02 between the second substrate 200 and the second sacrificial layer 900 to room temperature to form a second liquid crystal layer 302. Liquid crystal molecules 3011 in the first liquid crystal layer 301 and liquid crystal molecules 3021 in the second liquid crystal layer 302 are negative type liquid crystal molecules.

In an embodiment, at least one of the absolute value of the dielectric anisotropy parameter of the liquid crystal molecules 3011 in the first liquid crystal layer 301 and the absolute value of the dielectric anisotropy parameter of the liquid crystal molecules 3021 in the second liquid crystal layer 302 is not less than 4.

Specifically, the target mixture 02 may be cooled at 5° C.-10° C./min. The polyimide material 022 will precipitate out of the target mixture 02 due to its limited solubility. Subsequently, the polyimide material 022 will form vesicles wrapping the liquid crystal material 021 of the target mixture 02, thereby forming the first liquid crystal layer 301 and second liquid crystal layer 302.

For example, the liquid crystal molecules 3011 in the first liquid crystal layer 301 are contained in first vesicles 3012, and the liquid crystal molecules 3021 in the second liquid crystal layer 302 are contained in second vesicles 3022. Furthermore, at least one of the first vesicles 3012 and the second vesicles 3022 comprises

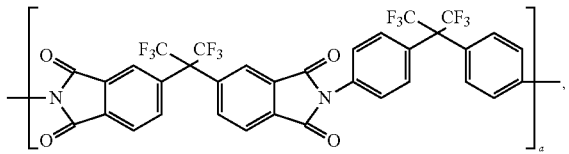

where a is not less than 50 and not greater than 300.

S50: separating the first sacrificial layer 800 and the third substrate 600 from the first liquid crystal layer 301, and separating the second sacrificial layer 900 and the fourth substrate 700 from the second liquid crystal layer 302.

Specifically, the first sacrificial layer 800 and the second sacrificial layer 900 may be irradiated with ultraviolet light. Irradiation time is 1-20 minutes. Irradiation intensity is 60-100 mW/cm$^2$. The first sacrificial layer 800 and the second sacrificial layer 900 are decomposed, so that the third substrate 600 is peeled off from the first substrate 100, and the fourth substrate 700 is peeled off from the second substrate 200.

S60: disposing the first substrate 100 and the second substrate 200 oppositely, and disposing a third liquid crystal layer 303 between the first liquid crystal layer 301 and the second liquid crystal layer 302. Liquid crystal molecules 3031 in the third liquid crystal layer 303 are negative type liquid crystal molecules. An absolute value of a dielectric anisotropy parameter of the liquid crystal molecules 3011 in the first liquid crystal layer 301 and an absolute value of a dielectric anisotropy parameter of the liquid crystal molecules 3021 in the second liquid crystal layer 302 are both greater than an absolute value of a dielectric anisotropy parameter of the liquid crystal molecules 3031 in the third liquid crystal layer 303, so that under action of a same electric field, the first protrusions, and the second protrusions, a difference between a deflection value of the liquid crystal molecules 3011 in the first liquid crystal layer 301 and a deflection value of the liquid crystal molecules 3031 in the third liquid crystal layer 303 and a difference between a deflection value of the liquid crystal molecules 3021 in the second liquid crystal layer 302 and the deflection value of the liquid crystal molecules 3031 in the third liquid crystal layer 301 are within a preset range.

In an embodiment, the absolute value of the dielectric anisotropy parameter of the liquid crystal molecules 3031 in the third liquid crystal layer 303 is not less than 3 and less than 4.

It should be noted that an absolute value of a dielectric anisotropy parameter of the liquid crystal molecules 3011 in the first liquid crystal layer 301 and an absolute value of a dielectric anisotropy parameter of the liquid crystal molecules 3021 in the second liquid crystal layer 302 are both greater than an absolute value of a dielectric anisotropy parameter of the liquid crystal molecules 3031 in the third liquid crystal layer 303, so that under action of a same electric field, the first protrusions 400, and the second protrusions 500, a difference between a deflection value of the liquid crystal molecules 3011 in the first liquid crystal layer 301 and a deflection value of the liquid crystal molecules 3031 in the third liquid crystal layer 303 and a difference between a deflection value of the liquid crystal molecules 3021 in the second liquid crystal layer 302 and the deflection value of the liquid crystal molecules 3031 in the third liquid crystal layer 301 are within a preset range. A deflection value comprises a deflection direction of liquid crystal molecules and a deflection angle of the liquid crystal molecules along the direction. The statement "a difference . . . are within a preset range" means that the deflection value of the liquid crystal molecules 3011 in the first liquid crystal layer 301, the deflection value of the liquid crystal molecules 3021 in the second liquid crystal layer 302, and the deflection value of the liquid crystal molecules 3031 in the third liquid crystal 303 layer tend to be consistent. That is, deflection directions of the liquid crystal molecules 3011 in the first liquid crystal layer 301, the liquid crystal molecules 3021 in the second liquid crystal layer 302, and the liquid crystal molecules 3031 in the third liquid crystal layer 303 tend to be consistent. And, deflection angles of the liquid crystal molecules 3011 in the first liquid crystal layer 301, the liquid crystal molecules 3021 in the second liquid crystal layer 302, and the liquid crystal molecules 3031 in the third liquid crystal layer 303 along the direction tend to be consistent.

The present disclosure provides a display panel and a method for fabricating the same. The display panel comprises a first substrate, a second substrate, and a liquid crystal layer. The first substrate and the second substrate are oppositely disposed. The first substrate has first protrusions on its side close to the second substrate. The second substrate has second protrusions on its side close to the first protrusion. The liquid crystal layer comprises a first liquid crystal layer close to the first protrusions, a second liquid crystal layer close to the second protrusions, and a third liquid crystal layer between the first liquid crystal layer and the second liquid crystal layer. Liquid crystal molecules in the first liquid crystal layer, the second liquid crystal layer, and the third liquid crystal layer are all negative type liquid crystal molecules. An absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a deflection value of the liquid crystal molecules in the first liquid crystal layer, a deflection value of the liquid crystal molecules in the second liquid crystal layer, and a deflection value of the liquid crystal molecules in the third liquid crystal layer tend to be consistent. This reduces influence of the first protrusion and the second protrusion on a light transmittance of a backlight, and thus improves display quality of an image.

The present application has been described in the above preferred embodiments, but the preferred embodiments are not intended to limit the scope of the present application, and those skilled in the art may make various modifications without departing from the scope of the present application. The scope of the present application is determined by claims.

What is claimed is:

1. A display panel, comprising:
   a first substrate provided with a first protrusion on a side thereof;
   a second substrate disposed opposite to the first substrate, and provided with a second protrusion on its side close to the first protrusion; and
   a liquid crystal layer comprising:
      a first liquid crystal layer disposed on a side of the first protrusion close to the second protrusion;
      a second liquid crystal layer disposed on a side of the second protrusion close to the first protrusion; and
      a third liquid crystal layer disposed between the first liquid crystal layer and the second liquid crystal layer;
   wherein liquid crystal molecules in the first liquid crystal layer, liquid crystal molecules in the second liquid crystal layer, and liquid crystal molecules in the third liquid crystal layer are all negative type liquid crystal molecules, and an absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a difference between a deflection value of the liquid crystal molecules in the first liquid crystal layer and a deflection value of the liquid crystal molecules in the third liquid crystal layer is within a preset range, and a difference between a deflection value of the liquid crystal molecules in the second liquid crystal layer and the deflection value of the liquid crystal molecules in the third liquid crystal layer is also within the preset range;
   wherein at least one of the absolute value of the dielectric anisotropy parameter of the liquid crystal molecules in the first liquid crystal layer and the absolute value of the dielectric anisotropy parameter of the liquid crystal molecules in the second liquid crystal layer is not less than 4; and
   wherein the first substrate comprises a first alignment layer, the second substrate comprises a second alignment layer, and at least one of the first alignment layer and the second alignment layer comprises

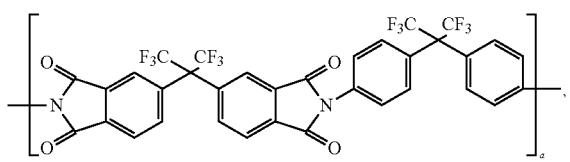

where a is not less than 50 and not greater than 300.

2. The display panel according to claim 1, wherein the absolute value of the dielectric anisotropy parameter of the liquid crystal molecules in the third liquid crystal layer is not less than 3 and less than 4.

3. The display panel according to claim 1, wherein the first substrate further comprises a first electrode layer disposed on a side of the first alignment layer away from the liquid crystal layer, the second substrate further comprises a second electrode layer disposed on a side of the second alignment layer away from the liquid crystal layer, there is an electric field between the first electrode layer and the second electrode layer, and the electric field deflects liquid crystal molecules in the liquid crystal layer.

4. A display panel, comprising:
a first substrate provided with a first protrusion on a side thereof;
a second substrate disposed opposite to the first substrate, and provided with a second protrusion on its side close to the first protrusion; and
a liquid crystal layer comprising:
a first liquid crystal layer disposed on a side of the first protrusion close to the second protrusion;
a second liquid crystal layer disposed on a side of the second protrusion close to the first protrusion; and
a third liquid crystal layer disposed between the first liquid crystal layer and the second liquid crystal layer;
wherein liquid crystal molecules in the first liquid crystal layer, liquid crystal molecules in the second liquid crystal layer, and liquid crystal molecules in the third liquid crystal layer are all negative type liquid crystal molecules, and an absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a difference between a deflection value of the liquid crystal molecules in the first liquid crystal layer and a deflection value of the liquid crystal molecules in the third liquid crystal layer is within a preset range, and a difference between a deflection value of the liquid crystal molecules in the second liquid crystal layer and the deflection value of the liquid crystal molecules in the third liquid crystal layer is also within the preset range.

5. The display panel according to claim 4, wherein at least one of the absolute value of the dielectric anisotropy parameter of the liquid crystal molecules in the first liquid crystal layer and the absolute value of the dielectric anisotropy parameter of the liquid crystal molecules in the second liquid crystal layer is not less than 4.

6. The display panel according to claim 5, wherein the absolute value of the dielectric anisotropy parameter of the liquid crystal molecules in the third liquid crystal layer is not less than 3 and less than 4.

7. The display panel according to claim 4, wherein the first substrate comprises a first alignment layer, the second substrate comprises a second alignment layer, and at least one of the first alignment layer and the second alignment layer comprises

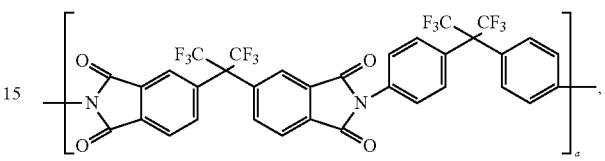

where a is not less than 50 and not greater than 300.

8. The display panel according to claim 7, wherein the first substrate further comprises a first electrode layer disposed on a side of the first alignment layer away from the liquid crystal layer, the second substrate further comprises a second electrode layer disposed on a side of the second alignment layer away from the liquid crystal layer, there is an electric field between the first electrode layer and the second electrode layer, and the electric field deflects liquid crystal molecules in the liquid crystal layer.

9. A method for fabricating a display panel, comprising:
providing a first substrate, a second substrate, a third substrate, and a fourth substrate, wherein the first substrate and the third substrate are oppositely disposed, the second substrate and the fourth substrate are oppositely disposed, the first substrate is provided with a first protrusion on its side close to the third substrate, the second substrate is provided with a second protrusion on its side close to the fourth substrate;
forming a first sacrificial layer on a side of the third substrate close to the first substrate;
forming a second sacrificial layer on a side of the fourth substrate close to the second substrate;
disposing a target mixture between the first substrate and the first sacrificial layer;
disposing the target mixture between the second substrate and the second sacrificial layer;
cooling the target mixture between the first substrate and the first sacrificial layer to room temperature to form a first liquid crystal layer, wherein liquid crystal molecules in the first liquid crystal layer are negative type liquid crystal molecules;
cooling the target mixture between the second substrate and the second sacrificial layer to room temperature to form a second liquid crystal layer, wherein liquid crystal molecules in the second liquid crystal layer are negative type liquid crystal molecules;
separating the first sacrificial layer and the third substrate from the first liquid crystal layer;
separating the second sacrificial layer and the fourth substrate from the second liquid crystal layer;
disposing the first substrate and the second substrate oppositely; and
disposing a third liquid crystal layer between the first liquid crystal layer and the second liquid crystal layer, wherein liquid crystal molecules in the third liquid crystal layer are negative type liquid crystal molecules;

wherein an absolute value of a dielectric anisotropy parameter of the liquid crystal molecules in the first liquid crystal layer and an absolute value of a dielectric anisotropy parameter of the liquid crystal molecules in the second liquid crystal layer are both greater than an absolute value of a dielectric anisotropy parameter of the liquid crystal molecules in the third liquid crystal layer, so that under action of a same electric field, the first protrusion, and the second protrusion, a difference between a deflection value of the liquid crystal molecules in the first liquid crystal layer and a deflection value of the liquid crystal molecules in the third liquid crystal layer is within a preset range, and a difference between a deflection value of the liquid crystal molecules in the second liquid crystal layer and the deflection value of the liquid crystal molecules in the third liquid crystal layer is also within the preset range.

10. The method according to claim 9, wherein the target mixture is composed of a liquid crystal material and a polyimide material, a mass ratio of the liquid crystal material and the polyimide material is 7:3 or 8:2, an absolute value of a dielectric anisotropy parameter of liquid crystal molecules in the liquid crystal material is not less than 4, and the polyimide material comprises

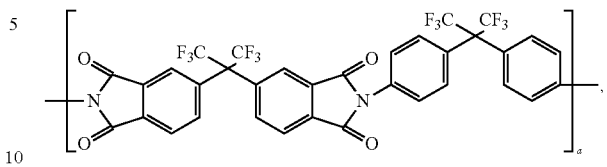

where a is not less than 50 and not greater than 300.

11. The method according to claim 9, wherein at least one of the absolute value of the dielectric anisotropy parameter of the liquid crystal molecules in the first liquid crystal layer and the absolute value of the dielectric anisotropy parameter of the liquid crystal molecules in the second liquid crystal layer is not less than 4.

12. The method according to claim 10, wherein the absolute value of the dielectric anisotropy parameter of the liquid crystal molecules in the third liquid crystal layer is not less than 3 and less than 4.

* * * * *